Figure 1:
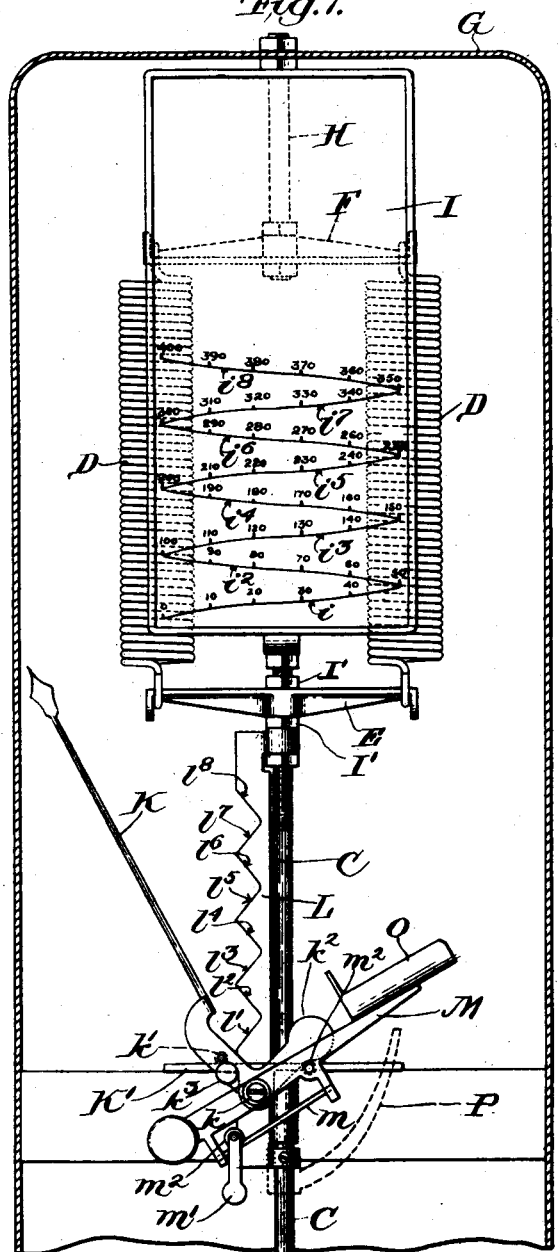

No. 683,477. Patented Oct. 1, 1901.
A. A. MEYER.
WEIGHING MACHINE.
(Application filed July 24, 1901.)
(No Model.) 2 Sheets—Sheet 1.

Witnesses:
Arthur J. Randall
Geo. N. Goddard

Inventor:
Andrew A. Meyer
by Ira L. Fish Attorney.

No. 683,477. Patented Oct. 1, 1901.
A. A. MEYER.
WEIGHING MACHINE.
(Application filed July 24, 1901.)
(No Model.) 2 Sheets—Sheet 2.

Witnesses:
Inventor:
Andrew A Meyer
by
Ira L. Fish Attorney.

UNITED STATES PATENT OFFICE.

ANDREW A. MEYER, OF QUINCY, MASSACHUSETTS.

WEIGHING-MACHINE.

SPECIFICATION forming part of Letters Patent No. 683,477, dated October 1, 1901.

Application filed July 24, 1901. Serial No. 69,538. (No model.)

*To all whom it may concern:*

Be it known that I, ANDREW A. MEYER, of Quincy, in the county of Norfolk and State of Massachusetts, have invented certain new and useful Improvements in Weighing-Machines, of which the following is a specification.

The invention relates to coin-controlled weighing-machines in which the weight of a person standing upon the platform of the machine is indicated only upon the insertion of a coin in a slot in the machine provided for the purpose; and its object is to provide a mechanism which is simple and efficient in construction and which is not liable to be injured or rendered inoperative by rough usage such as machines of this character are frequently subjected to.

In the machine embodying all the various features of the invention the weighing or counterbalancing mechanism is separate from the indicating mechanism and is free to operate when a person steps upon the platform. The indicating mechanism is not operated, however, to disclose the weight of the person on the platform until a coin is inserted. The operation of the weighing or counterbalancing mechanism moves a graduated scale which is connected therewith a certain distance, dependent upon the weight upon the platform, and also moves a device which determines the position into which the indicator will be moved upon the insertion of a coin. By thus moving the scale, as well as the indicator-controlling device, through the movement of the weighing mechanism the scale may be arranged in a compact space, and the distance through which it is necessary to move the indicator in indicating a wide range of weights may also be reduced to a minimum. The scale is preferably formed on a plate, with the graduations arranged in intersecting lines, and the plate is preferably connected with the weighing mechanism by being secured directly to the rod which connects with the platform-levers, although other forms of scales and arrangements of graduations or other connections between the scale and weighing mechanism, which will cause the scale to be moved to an extent varying with the weight, may be employed. The indicating device which coöperates with the movable scale is preferably in the form of a pointer, and the movement of the pointer is controlled by a controller so connected with the weighing mechanism that it is moved to varying distances by different weights. This controller is preferably in the form of a plate secured to the rod which connects with the platform-levers and provided with a series of intersecting controlling-surfaces corresponding to the lines of graduations on the scale-plate. These and the various other features of the invention to be referred to will be made more clear by referring to a machine embodying the same, and in the accompanying drawings I have shown a machine embodying all the features of the invention in their preferred forms.

Figure 2:
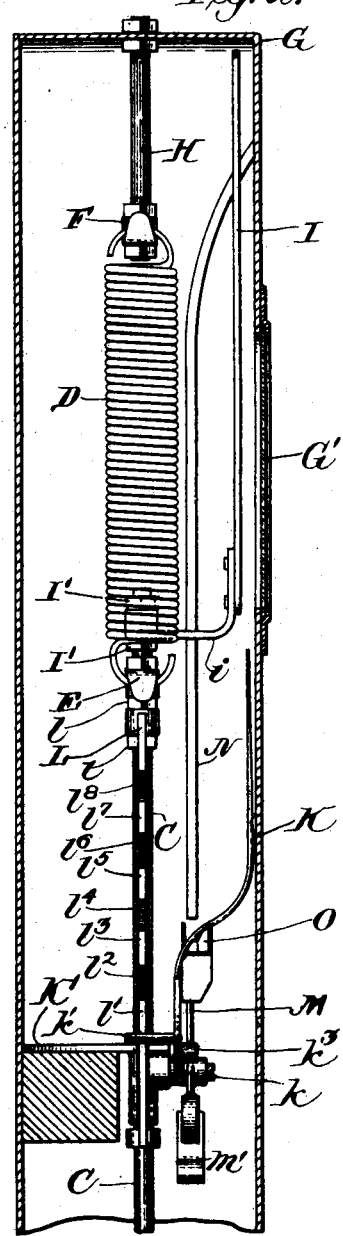
Figure 3:
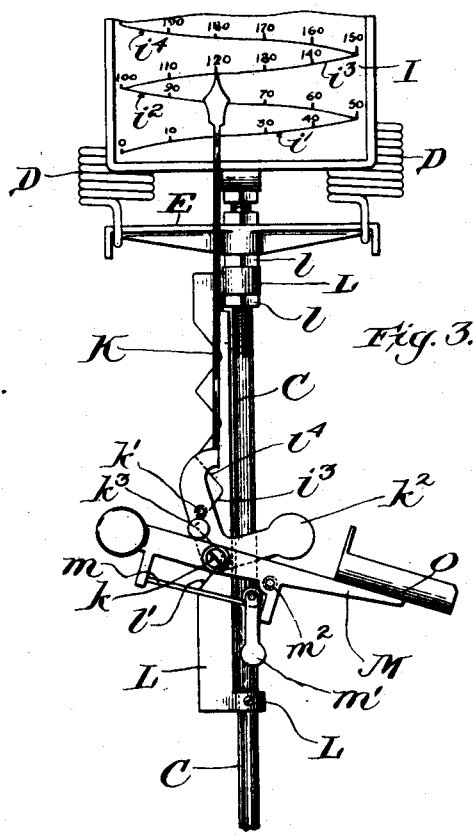
Figure 4:

In the drawings, Figure 1 is a front elevation of the upper part of the machine with the front of the casing removed. Fig. 2 is a side elevation showing the casing in section. Fig. 3 is a detail showing the same parts shown in Fig. 1, but in a different position; and Fig. 4 is a side elevation showing the connection between the platform-levers and the other devices.

In the machine shown in the drawings the person to be weighed is supported upon a platform A, resting upon a system of levers, as is usual in this type of machine, one of the levers B being connected by means of a rod C with the counterbalancing devices. The weight upon the platform is counterbalanced and measured by springs D, the lower ends of which are connected with a cross-piece E, secured to the rod C, and the upper ends of which are connected to a cross-piece F, suspended from the top of the casing G by the rod H. When a person stands upon the platform A, the springs D are extended until they counterbalance the weight of the person, and the extent to which they are extended, and therefore the distance through which the parts sustained by said springs are moved, depends upon the weight upon the platform, the springs being extended and the parts being moved to varying distances by different weights. This weighing mechanism is free to operate whenever a person steps upon the platform, and its operation also causes the movement of the graduated scale with which the indicator coöperates in disclosing the weight on the platform. In the machine shown the graduated scale is formed on a plate I, which is caused to move in unison with the weighing mechanism by being secured to an arm $i$, adjustably attached to the upper end of the rod C by nuts I'. The plate is arranged back of an opening in the front of the casing G and is protected by a glass plate G', mounted in said opening. The graduations are arranged in intersecting lines $i'$ to $i^8$, extending back and forth across the plate, as shown in Figs. 1 and 3. As indicated in the drawings, the lines of graduations are so arranged that each fifty pounds upon the platform will depress the scale-plate a distance equal to the vertical distance between the opposite ends of each line—that is to say, if fifty pounds is on the platform the scale-plate will be depressed until the right end of line $i'$ is at the same height that the left end of line $i'$ is when no weight is on the platform, or if one hundred pounds is on the platform the left end of line $i^2$ will be at the same height that the left end of $i'$ is when no weight is on the platform, and so on for each fifty pounds added to the weight on the platform.

The indicator which indicates the weight consists of a pointer K, pivoted at $k$ to a stationary supporting-plate $k'$, so that the end of the pointer may swing across the plate G. The pointer is normally back out of sight within the casing, and its position when operated to disclose the weight on the platform is controlled by a controller-plate L, connected to be moved by the weighing mechanism by being secured to the rod C. The plate L is adjustably held in position by the nuts $l$ upon the rod C, which engage opposite sides of one of the lugs L' on the plate through which the rod passes. The controller-plate is provided with a series of intersecting controlling-surfaces $l'$ to $l^8$, corresponding to the lines $i'$ to $i^8$ on the scale-plate, which surfaces engage the pin $k'$ when the pointer $k$ is swung forward and determine the distance which the pointer will travel across the scale-plate. For instance, if there is one hundred pounds upon the platform the controller will be depressed sufficiently to bring the point at the intersection of surfaces $l^2$ $l^3$ into the path of the pin $k'$, and when the pointer swings forward its upper end will be at the intersection of lines $i^2$ $i^3$. For any weight less than one hundred pounds the controller will be depressed a less distance, and the pin $k'$ will engage one of the inclined surfaces $l'$ or $l^2$ when the pointer is swung forward, and the upper end of the pointer will be at some point on the lines $i'$ $i^2$, the point being determined by the weight on the platform.

Any suitable mechanism may be employed for causing the operation of the indicator upon the insertion of a coin—such, for instance, as are employed in various forms of coin-controlled weighing-machines; but it is preferred to employ the form of mechanism shown in the drawings. This mechanism embodies certain features of invention, which are not limited in their application to machines having the arrangement of graduated scale and controller shown in the drawings, but may be used with advantage wherever it is desired to control the operation of an indicator by the insertion of a coin. In this construction the pointer is supported in its normal position by a pin $k'$, which rests upon the upper surface of the plate K'. The weight of the pointer is slightly in excess of its counterweight-arm $k^2$, which extends upon the opposite side of the pivot $k$, so that the pointer will remain in its normal position until moved therefrom through the insertion of the coin. The devices for causing a movement of the pointer when a coin is inserted consist of a lever M, mounted on the pivot $k$ and carrying a weight, which is so arranged that as the lever is swung about its pivot the force exerted by the weight is shifted from one side of the pivot-point to the other, the result being that the weight acts to resist movement of the lever until the lever has turned through a certain distance and then tends to continue or assist the movement of the lever in the same direction. The weight may be supported on or connected to the lever in any suitable manner to produce this result, but is preferably mounted thereon so that it may shift or slide bodily longitudinally of the lever. In the construction shown the lever is provided with a guide-rod $m$, upon which a weight $m'$ is suspended, the upper end of the weight being provided with a roller $m^2$, which runs on the guide-rod and facilitates the movement of the weight from one end of the rod to the other as the lever rocks about its pivot. The upper end or front end of the lever is provided with a plate or receptacle O for receiving a coin as it drops from the coin-chute N, Fig. 2, and the lever is normally in the position shown in Fig. 1, with the receiver end raised and the weight $m'$ on the opposite side of the pivot $k$ from the coin plate or receptacle. When in this position, a pin on the lever engages the under side of arm $k^2$ and prevents farther upward movement of the front end of the lever. When a coin passes down through the coin-chute, it strikes the coin-plate O and swings this end of the lever downward until the coin passes off of the end of the lever. This movement of the lever causes the rear end of the lever to strike a pin $k^3$ on the pointer, causing the pointer to swing forward with the rear end of the lever. About the time the lever strikes the pin $k^3$ the guide-rod $m$ has passed the horizontal and the weight $m'$ slides to the opposite end of the guide-rod, so that it acts to assist the coin in continuing the movement of the lever or acts to continue the movement of the lever after the coin has passed off of the plate O. The coin and weight, or the weight alone, continue the downward movement of the front end of the lever and the forward movement of the pointer until the pin $k'$ is arrested by the controller-plate, and the weight holds the lever and pointer in this position until they are returned to their normal position. In the construction shown the surfaces $l'$ to $l^8$ not only act as controller-surfaces, but they also act as cam-surfaces for returning the indicator mechanism to its normal position. The operation of the surfaces $l'$ to $l^8$ as means for returning the indicator mechanism will be made clear by considering the operation of the machine in weighing and indicating the weight of a person. Suppose, for instance, a person weighing one hundred and twenty pounds steps upon the platform. Then the weighing mechanism and scale-plate will be depressed to the position indicated in Fig. 3, the indicating mechanism remaining as in Fig. 1. If the person now inserts a coin in the coin-chute, the coin will strike on the end of lever M, swing said lever about its pivot, and will cause the indicating mechanism to assume the position shown in Fig. 3, with the pin $k'$ against the surface $l^3$ and with weight $m'$ on the front side of the pivot $k$. When the person steps off of the platform, the springs D will suddenly raise the controller-plate, and the surface $l^3$ will throw the pointer backward, the pin $k^3$ acting to swing the lever M about the pivot, so that the guide-rod $m$ is carried by the horizontal, when the weight $m'$ will slide to the left end of the rod and return the lever M to its normal position. The backward movement of the pointer will be arrested by the plate K and pin $k'$, and the parts will be in the position shown in Fig. 1. With this construction only a partial upward movement of the controller is required to return the parts, thus preventing the weighing of two persons by having the second person step on as the first person steps off and before the weighing mechanism has fully returned to its normal position. If the weight upon the platform is increased after the weight has been once indicated, as by a second person stepping onto the platform before the first person steps off, the indicator mechanism is returned to its normal position. For instance, if with the parts in the position shown in Fig. 3 the weight is increased, the surface $l^4$ will act to return the parts to their normal position in the manner above indicated. An arm P, (shown in dotted lines in Fig. 1,) which is in the nature of a safety device, is arranged to strike the under side of the lever M, when the weighing mechanism returns to normal position and will act to return the indicating mechanism to normal position in case it should not be returned by the surfaces $l'$ to $l^8$.

When the parts are in their normal position, any jumping upon the platform will not affect the indicating mechanism, for the reason that the pin $k'$ is then out of engagement with the controller and any violent movement of the controller cannot affect the indicating mechanism.

The above construction affords a simple and efficient mechanism for accurately determining the weight of a person upon the introduction of a coin and at the same time avoids any danger of two or more persons ascertaining their weight by the introduction of a single coin and provides against injury to the machine by jumping upon the platform.

What I claim, and desire to secure by Letters Patent, is—

1. The combination of mechanism moved to varying distances by different weights, a graduated scale operated by the movement of said mechanism, an indicator-controller operated by the movement of said mechanism, and a coin-controlled indicator arranged to coöperate with the scale to indicate the weight, substantially as described.

2. The combination of mechanism moved to varying distances by different weights, a plate connected with said mechanism, having graduations arranged in intersecting lines, a controller connected with said mechanism having a series of intersecting controlling-surfaces corresponding to the lines on said plate, an indicator the position of which when operated is controlled by said controller, and means whereby the indicator is operated upon the insertion of a coin, substantially as described.

3. The combination of weighing mechanism, a plate connected with said mechanism having a graduated scale thereon, a controller-plate connected with said mechanism having controlling-surfaces thereon, a pointer mounted to move across the face of said scale-plate, coin-controlled mechanism for moving said pointer into engagement with said controlling-surfaces, and mechanism for returning said pointer to its normal position, substantially as described.

4. The combination of weighing mechanism, a plate connected therewith having graduations arranged in intersecting lines, a plate L connected with the weighing mechanism and having intersecting surfaces $l'$, $l^2$, &c., formed thereon, a pointer K and coin-controlled means for moving said pointer into engagement with said surfaces, substantially as described.

5. The combination of a weighing mechanism, a controller operated thereby, an indicator, a lever for operating said indicator having its front end arranged in the path of a coin, a weight carried by the lever and arranged to act upon the rear side of the lever-fulcrum when the lever is in normal position and to be shifted from one side of the fulcrum to the other as the lever is rocked on its fulcrum, substantially as described.

6. The combination of an indicator, a lever for operating said indicator having its front end in the path of a coin, a weight carried by the lever and arranged to act upon opposite sides of the fulcrum as the lever is rocked, and means for returning the indicator and lever after they have been operated by the coin, substantially as described.

7. The combination of an indicator, a lever for operating said indicator having its front end in the path of a coin, a weight guided on the lever to slide from one side of the fulcrum to the other as the lever rocks, and means for returning the indicator and lever after they have been operated by the coin, substantially as described.

8. The combination of an indicator K, a lever M for operating said indicator having a coin-plate or receptacle O at its front end, and a weight $m'$ mounted to slide on the lever from one side of the fulcrum to the other, substantially as described.

9. The combination of weighing mechanism, a controller having an inclined controlling-surface connected with said mechanism, an indicator the position of which when operated is controlled by said controlling-surface, and means whereby the indicator is operated upon the insertion of a coin, substantially as described.

In testimony whereof I have affixed my signature in presence of two witnesses.

ANDREW A. MEYER.

Witnesses:
IRA L. FISH,
GEO. N. GODDARD.